United States Patent [19]
Ide et al.

[11] Patent Number: 5,103,943
[45] Date of Patent: Apr. 14, 1992

[54] VIBRATION DAMPER FOR POWER UNIT

[75] Inventors: Takanobu Ide, Isehara; Masamitsu Kojima, Fujisawa; Masura Iwakura, Fujisawa; Masami Mochimaru, Fujisawa, all of Japan

[73] Assignees: Nissan Motor Co., Ltd., Yokohama; Oiles Corporation, Tokyo, both of Japan

[21] Appl. No.: 620,858

[22] Filed: Dec. 3, 1990

[30] Foreign Application Priority Data

Dec. 20, 1989 [JP] Japan .................. 1-330316

[51] Int. Cl.⁵ ............... F16F 9/14; F16F 9/12; B60G 13/08; F16M 13/00
[52] U.S. Cl. .................... 188/306; 180/300; 248/562; 248/567; 248/636; 248/638; 267/140.1; 188/322.5
[58] Field of Search ........... 248/636, 562, 638, 567, 248/564, 659, ; 180/300, 902, 312; 188/306-310, 290, 296, 322.5, 268, 264 R, 264 E; 267/140.1, 219, 257, 258, 217, 218

[56] References Cited

U.S. PATENT DOCUMENTS

| | | | |
|---|---|---|---|
| 4,503,952 | 3/1985 | Hesse | 188/306 |
| 4,768,630 | 9/1988 | Aubry et al. | 188/307 X |
| 4,790,521 | 12/1988 | Ide et al. | 248/562 X |
| 4,991,816 | 2/1991 | Ide et al. | 248/562 |
| 5,037,058 | 8/1991 | Kojima et al. | 180/300 X |

FOREIGN PATENT DOCUMENTS

| | | |
|---|---|---|
| 0234157 | 9/1987 | European Pat. Off. . |
| 0345736 | 12/1989 | European Pat. Off. . |
| 0389681 | 10/1990 | European Pat. Off. . |
| 2507726 | 12/1982 | France . |
| 63-14036 | 1/1988 | Japan . |

*Primary Examiner*—Douglas C. Butler
*Attorney, Agent, or Firm*—Foley & Lardner

[57] ABSTRACT

A vibration damper for damping roll vibration of a power unit mounted on a vehicle body. The vibration damper is composed of a disc plate fixedly connected to the power unit in a manner that the axis of the disc plate is generally parallel with a roll axis of the power unit. The disc plate is sealingly disposed in a chamber formed in a generally circular casing which is coaxial with the disc plate. A viscous fluid is filled in a space defined between the disc plate and inner surface of the casing. The casing is formed of a plastic which has a higher linear expansion coefficient than a metal forming the disc plate, thereby allowing the space filled with the viscous fluid to expand along with thermal expansion of the viscous fluid.

11 Claims, 4 Drawing Sheets

VIBRATION DAMPER FOR POWER UNIT

BACKGROUND OF THE INVENTION

1. Field of the Invention

This invention relates to improvements in a vibration damper for damping roll vibration of a power unit of an automotive vehicle under the effect of viscous and shearing resistance of a viscous fluid, and more particularly to a device for preventing the viscous fluid from leaking out of a casing even upon the vibration damper being subjected to a high temperature.

2. Description of the Prior Art

A variety of vibration dampers for damping roll vibration of a power unit under the effect of a viscous fluid have been proposed and put into practical use. A typical one of them is disclosed in Japanese Utility Model Provisional Publication No. 63-14036. This vibration damper includes a disc plate fixedly connected to a power unit. The disc plate is sealingly and movably disposed in a chamber defined in a casing connected to a vehicle body. A viscous fluid is filled in a space between the disc plate and the inner surface of the casing defining the chamber.

However, drawbacks have been encountered in such a vibration damper. That is to say, since the disc plate and the casing are formed of the same material having the same thermal expansion coefficient, the volume of the viscous fluid having a thermal expansion coefficient larger than that of the disc plate and the casing increases due to heat generated from an engine, and thereby rises the internal pressure of the casing. This degrades the fluid-tight seal of the casing, thereby causing leaking of the viscous fluid out of the casing.

SUMMARY OF THE INVENTION

It is an object of the present invention to provide an improved vibration damper for a power unit, in which the internal pressure of a casing does not rise even upon thermal expansion of a viscous fluid within the casing, thereby effectively preventing degradation of a sealing ability of the casing.

Another object of the present invention is to provide an improved vibration damper for a power unit, in which the volume of a space defined between a disc plate and the inner surface of a casing increases when a viscous fluid stored in the space thermally expands due to engine heat.

A vibration damper of the present invention is for a power unit mounted on a vehicle body and comprises a disc plate fixedly connected to one of the power unit and the vehicle body. The disc plate is formed of a metal having a first predetermined linear expansion coefficient. A casing is provided having a chamber in which the disc plate is movably and sealingly disposed. The casing is formed of a plastic having a second predetermined linear expansion coefficient which is higher than the first predetermined linear expansion coefficient and mechanically connected to the other of the power unit and the vehicle body. A viscous fluid is filled in a space defined between the disc plate and the inner surface of the casing defining the chamber.

By virtue of the fact that the casing is formed of a plastic whose linear expansion coefficient is higher than that of the metal forming the disc plate, the volume of the space defined between the disc plate and the casing inner surface increases when the viscous fluid makes its thermal expansion upon being subjected to engine heat, thereby preventing the internal pressure in the casing from rising. This effectively prevents leaking of the viscous fluid out of the casing.

DETAILED DESCRIPTION OF THE INVENTION

Figure 1:
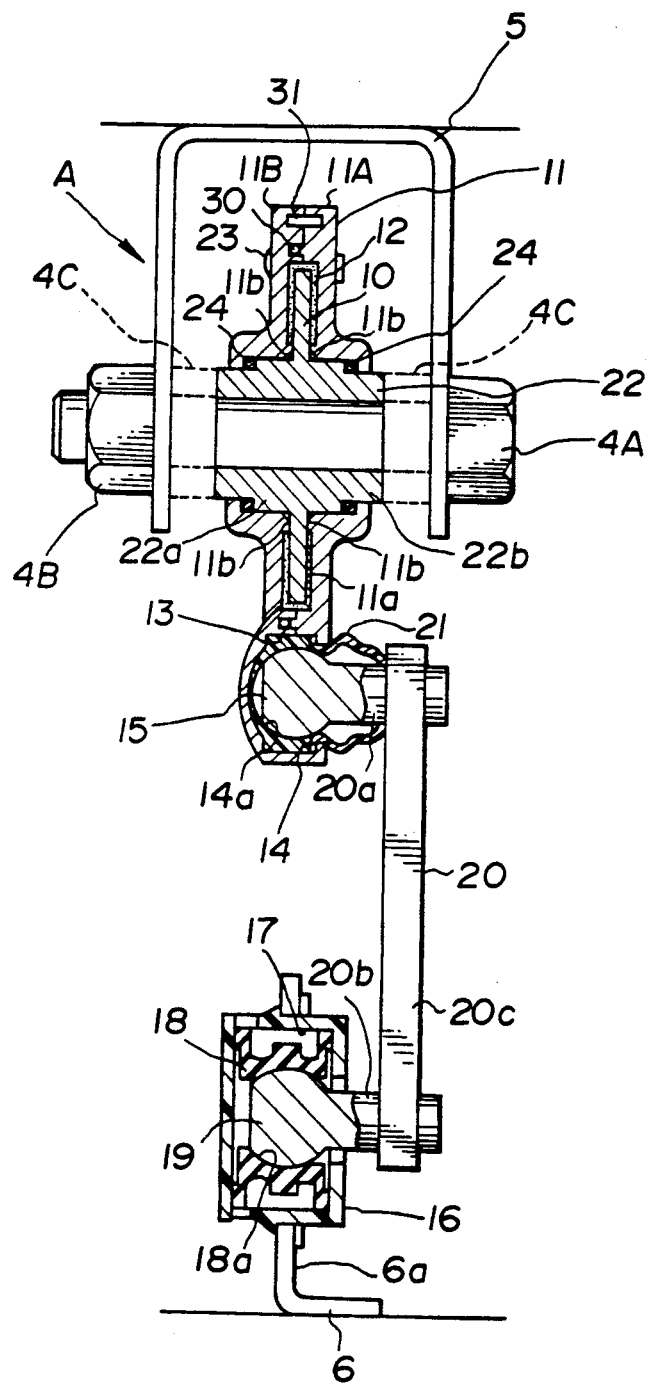
FIG. 1 is a front elevation, partly in section, of an embodiment of a vibration damper in accordance with the invention.
Figure 2:
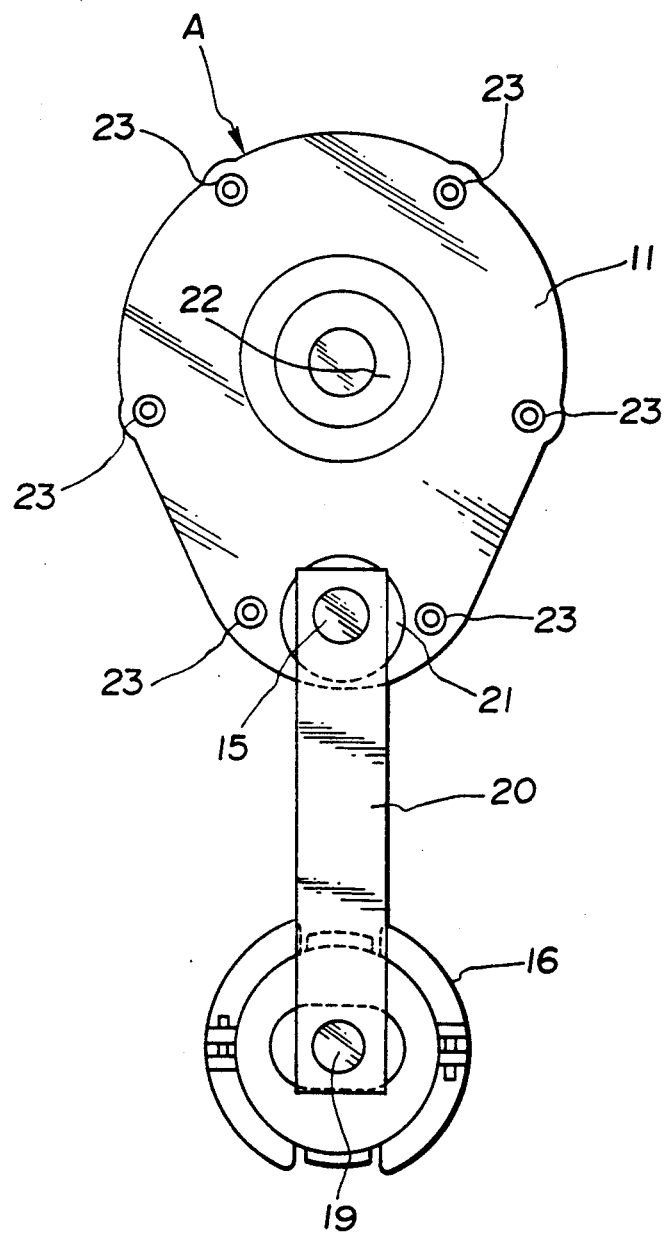
FIG. 2 is a side elevation of the vibration damper of FIG. 1.
Figure 3:
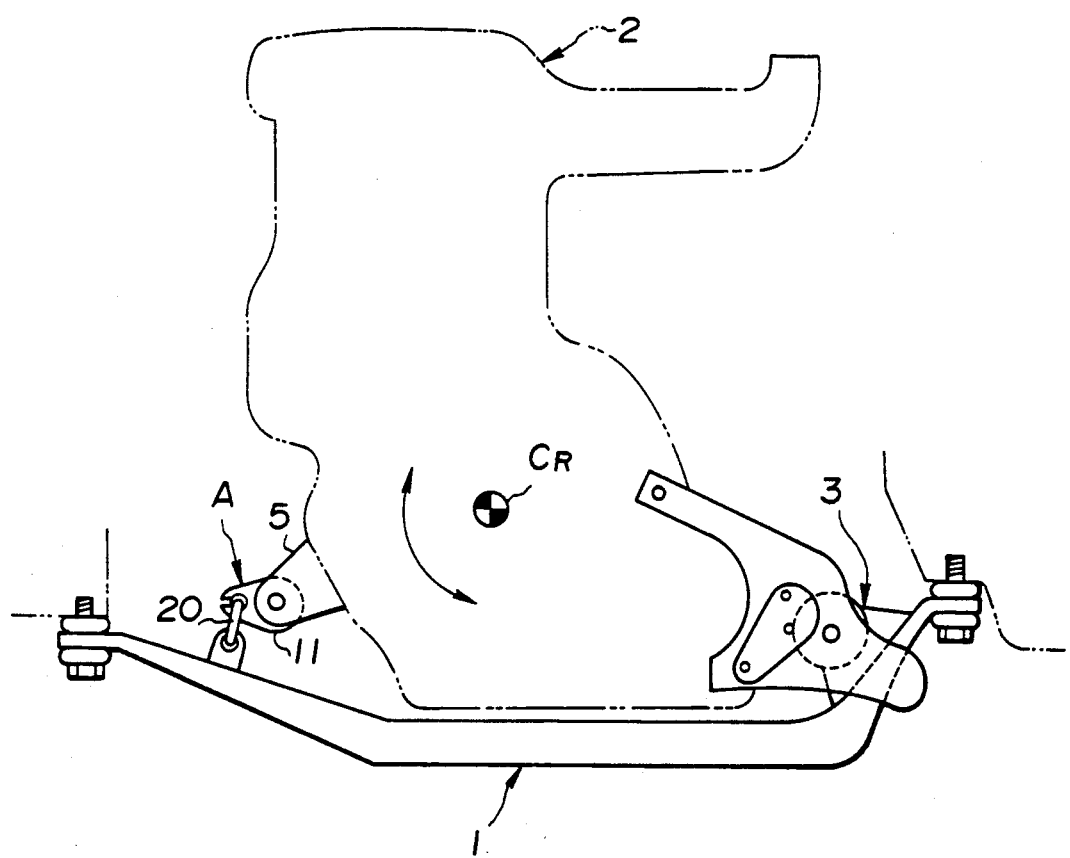
FIG. 3 is a side view showing the locational relationship of the vibration damper of FIG. 1 relative to a power unit and a vehicle body.

Referring now to FIGS. 1 to 3, an embodiment of a vibration damper of the present invention is illustrated by the reference character A. As shown in FIG. 3, the vibration damper A of this embodiment is used between a vehicle body (center member) 1 and a power unit 2. The power unit 2 is the combination of a transversely mounted engine and a trans-axle. The vibration damper A is used separate and independent from usual power unit mounts 3 through which the power unit 2 is mounted on the vehicle body 1.

As shown in FIGS. 1 and 2, the vibration damper A comprises an annular disc plate 12 which is disposed in a chamber 11a defined by an inner surface of a generally annular casing 11. The major part of the disc plate 10 is separate from the inner surface of the casing 11 defining the space 11a. Silicone oil (as a viscous fluid) 12 having a volume expansion coefficient of $9.6 \times 10^{-4}/°C$. is filled within the space 11a between the casing 11 and the disc plate 10. The disc plate 10 is integral and coaxial with an inner cylindrical member or hub section 22. The disc plate 10 extends radially outwardly from the outer peripheral surface of the inner cylindrical member 22. The integral body of the inner cylindrical member 22 and the disc plate 10 is formed of aluminum alloy having a linear expansion coefficient of $2.56 \times 10^{-5}/°C$. The inner cylindrical member 22 is formed at its central part with a large diameter section 22a which is larger in diameter than smaller diameter sections 22b which are contiguous with the large diameter section 22a and located at the opposite end parts of the inner cylindrical member 22. A bolt 4A is passed through the center hole (no numeral) of the inner cylindrical member 22 and fixed to the inner cylindrical member 22 by tightening a nut 4B engaged with the bolt 4A. As shown in FIG. 1, a pair of collars 4C are disposed in contact with the opposite ends of the inner cylindrical member 22.

A power unit side bracket 5 is fixedly secured to the power unit 2 and formed generally C-shaped to have a pair of opposite end sections (no numerals) which are parallel with each other. One of the opposite end sections of the bracket 5 is securely disposed between the head of the bolt 4A and the collar 4C while the other is securely disposed between the nut 4B and the collar 4C. Accordingly, the inner cylindrical member 22 and accordingly the disc plate 10 are fixedly connected to the power unit 2.

The casing 11 is rotatable with respect to the disc plate 10 and the cylindrical member 22. The casing 11 is made up of a pair of counterpart sections 11A, 11B which are in contact with each other at a partition plane (no numeral) which is perpendicular to the axis of the relative rotation of the casing 11 and the disc plate 10, i.e., the axis of the inner cylindrical member 22. The counterpart sections 11A, 11B are fixed to each other by means of rivets 23. The counterpart sections 11A, 11B may also be fixedly secured to each other by welding or press-fit. An O-ring 30 is disposed between the counterpart sections 11a, 11B to maintain a fluid-tight seal. Additionally, an 0-ring 24 is disposed between the peripheral surface of each small diameter section 22b of the inner cylindrical member 22 and each counterpart 11A, 11B of the casing 11, thereby maintaining a fluid-tight seal between them. The casing 11 is formed of polyacetal resin which has a linear expansion coefficient of $13.7 \times 10^{-5}/°C$. and is high in heat resistance, sliding characteristics and mechanical strength. The casing 11 may be formed of polyethylene resin, polyamide resin, polyphenylene sulfide resin, polybutylene terephthalate resin, phenolic resin, or a composite resin which is prepared by mixing known additives such as reinforcing material and lubricant into the above-mentioned respective various resins. Each counterpart section 11A, 11B of the casing 11 is formed with an annular projection 11b which is coaxial with the disc plate 10 and extends to be brought into slidable contact with the disc plate 10. Accordingly, the radially inward annular part of the disc plate 10 is put between the opposite annular projections 11b, 11b and in slidable contact with them. The projections 11b, 11b also define the chamber 11a. The reference numeral 31 designates a fluid trap into which silicone oil leaking through the O-ring 30 is trapped.

A generally hemispherical first ball seat surface 13 is formed at a part of the outer peripheral section of the casing 11. A first ball seat 14 is installed to the first ball seat surface 13. A first joint ball 15 is slidably fitted or supported on the ball seat surface 14a of the first ball seat 14 and integrally formed with a first link 20a which extends in a direction parallel with the axis of the inner cylindrical member 22. The center $C_1$ of the axis of the disc plate 10 and the center $C_2$ of the first joint ball 15 are in an imaginary vertical plane (not shown) which is perpendicular to a roll axis $C_R$ (in FIG. 3) of the power unit 2. The center $C_2$ corresponds to a joint center between the first ball seat 14 and the first joint ball 15. It will be understood that the power unit 2 rolls around the roll axis $C_R$ in directions indicated by a two headed arrow in FIG. 3. In this connection, the axis of the inner cylindrical member 22 and the axis of the first link 20a are generally parallel with the roll axis $C_R$ of the power unit 2.

A seat cover 16 is provided for a second joint ball 19 and fixedly secured through a vehicle body side bracket 6 to the vehicle body 1. The seat cover 16 is formed therein with a second ball seat surface 17 on which a second ball seat 18 formed of an elastomeric material is installed. The second joint ball 19 is slidably fitted or supported on the ball seat surface 18a of the second ball seat 18 and integrally formed with a second link 20b which extends in a direction generally parallel with the roll axis $C_R$ of the power unit 2. The second link 20b is fixedly connected to the first link 20a through a third link 20c which extends in a direction perpendicular to the roll axis $C_R$. The first, second and third links 20a, 20b, 20c constitute a link mechanism 20 which makes a rigid connection between the first and second joint balls 15, 19 without allowing any deformation of the relationship and any change in distance between the first and second joint balls 15, 19. The center $C_3$ of the joint ball 19 lies in the above-mentioned imaginary vertical plane containing the centers $C_1$, $C_2$. The center $C_3$ corresponds to a joint center between the second ball seat 18 and the second joint ball 19. Additionally, the vehicle body side bracket 6 has a vertically extending plate section 6a whose center plane is aligned with the imaginary vertical plane containing the center $C_3$ of the second joint ball 19. The first and second joint balls 15, 19 and the first, second and third links 20a, 20b, 20c are formed of a metallic material such as aluminum alloy, carbon steel, stainless steel or fiber reinforced metal.

Figure 5:
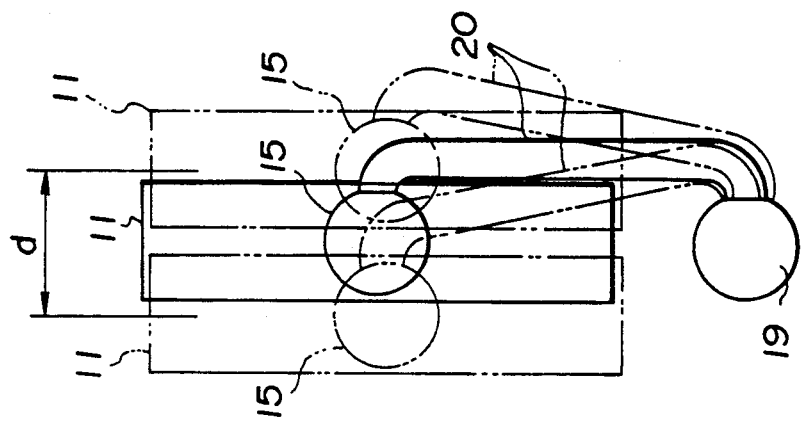
FIG. 5 is a schematic front view of the vibration damper of FIG. 4, illustrating the movement of the casing during the vibration damping.
Figure 4:
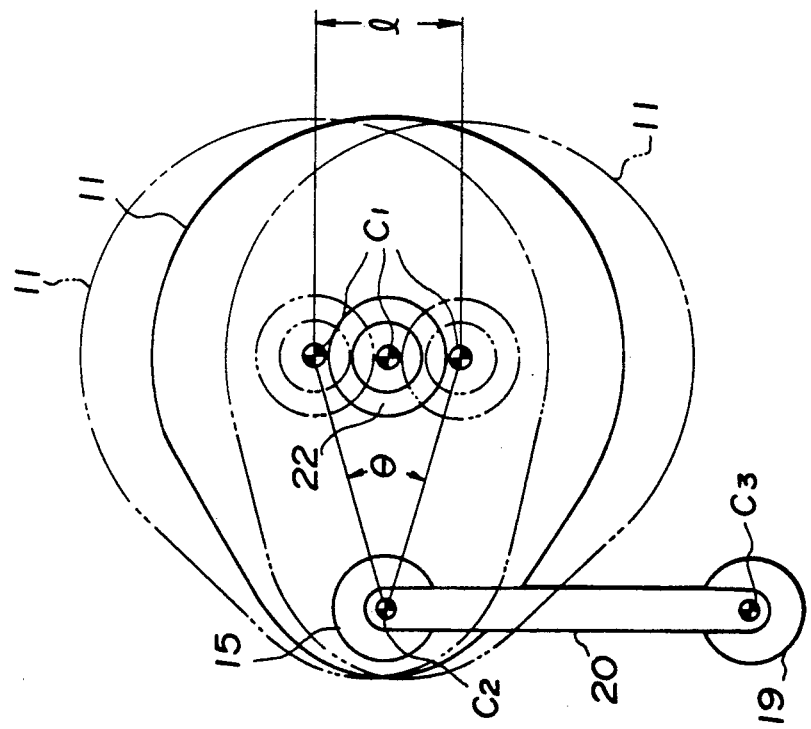
FIG. 4 is a schematic side view of the vibration damper of FIG. 1, illustrating the movement of a casing during vibration damping.

As shown in FIG. 4, assuming that the center $C_1$ linearly displaces by a distance l, this linear displacement is converted to a rotational displacement, in which damping vibration of the power unit 2 is carried out under viscous and shearing resistance of the silicone oil or viscous fluid 12. In this case, even if the amount of displacement of the joint ball 15 is considerably large in the direction generally parallel with the roll axis $C_R$ of the power unit 2 as shown in FIG. 5, the vibration damping effect of this vibration damper A is hardly affected because of the fact that the joint ball 15 is slidably supported by the spherical ball seat surface 14a of the first ball seat 14.

The manner of operation of the thus arranged vibration damper A will be discussed hereinafter.

When heat is generated from the engine to raise the temperature within an engine compartment to about 100° C., the disc plate 10, the casing 11 and the viscous fluid 12 thermally expand upon being heated. At this time, the volume of the space (filled with the viscous fluid) defined between the disc plate 12 and the casing inner surface considerably expands while the viscous fluid expands in volume, because the linear expansion coefficient of the casing 11 is considerably higher (about 2 to 8 times) than that of the disc plate 10. Accordingly, the internal pressure of the casing 11 is prevented from rising, thereby maintaining a high sealing the casing. This will be proved as follows:

In the case that the temperature within an engine compartment rises from 20° C. to 100° C., the ratio of the volume of the space defined between the inner surface (defining the chamber 11a) of the casing 11 and the surface of the disc plate 10° at 100° C. to that at 20° C. is calculated by the following equation:

$$\frac{(Va + dVa/dt) - (Vb + dVb/dt)}{Va - Vb} = 1.08439$$

where Va is the volume of the chamber 11a of the casing 11; Vb is the volume of the disc plate 10 within the chamber 11a; and t is the temperature.

The ratio of the volume of the viscous fluid (silicone oil) 12 at 100° C. to that at 20° C. is calculated by the following equation:

$$\frac{Va + dVa/dt}{Va} = 1.0768$$

Thus, it will be appreciated that according to the embodiment of the present invention, the volume ratio of the space defined between the inner surface of the casing 12 and the disc plate 10 is generally the same as that of the viscous fluid 12, thereby effectively preventing the internal pressure of the casing from increasing.

While the disc plate 10 and the casing 11 have been shown and described as being connected respectively with the power unit 2 and the vehicle body 1, it will be understood that the disc plate 10 and the casing 11 may be connected respectively with the vehicle body 1 and the power unit 2.

What is claimed is:

1. A vibration damper for a power unit mounted on a vehicle body, comprising:
    a disc plate fixedly connected to one of the power unit and the vehicle body, said disc plate being formed of a metal having a first predetermined linear expansion coefficient;
    a casing which is formed thereinside with a chamber in which said disc plate is movably and sealingly disposed, said casing being formed of a plastic having a second predetermined linear expansion coefficient higher than said first linear expansion coefficient;
    a viscous fluid filled in a space defined between said disc plate and an inner surface of said casing defining said chamber; and
    means for mechanically connecting said casing and the other of the power unit and the vehicle body.

2. A vibration damper as claimed in claim 1, wherein said metal is one selected from the group-consisting of aluminum alloy, carbon steel, stainless steel and fiber reinforced metal.

3. A vibration damper as claimed in claim 1, wherein said plastic is one selected from the group consisting of polyacetal resin, polyethylene resin, polyamide resin, polyphenylene sulfide resin, polybutylene terephthalate resin, and phenolic resin.

4. A vibration damper as claimed in claim 3, wherein said plastic contains at least one additive to form a composite resin.

5. A vibration damper as claimed in claim 1, wherein said viscous fluid is silicone oil.

6. A vibration damper as claimed in claim 1, wherein said disc plate is circular and said casing is generally circular in which said chamber is circular, wherein said disc plate and said casing are coaxial and relatively rotatable to each other around a common axis.

7. A vibration damper as claimed in claim 6, wherein said common axis is generally parallel with a roll axis of the power unit.

8. A vibration damper as claimed in claim 1, wherein said mechanically connecting means includes a link mechanism having a first end section movably connected to said casing and a second end section movably connected to the other of the power unit and the vehicle body.

9. A vibration damper as claimed in claim 8, further comprising means for defining a first ball seat at a peripheral part of said casing, means for defining a second ball seat and fixedly connected to the other of the power unit and the vehicle body.

10. A vibration damper as claimed in claim 9, wherein said link mechanism includes a first joint ball slidably fitted on said first ball seat, and a second joint ball slidably fitted on said second ball seat, and a link for rigidly connecting said first and second joint balls, said link extending in a direction generally perpendicular to the roll axis of the power unit.

11. A vibration damper as claimed in claim 1, wherein said disc plate is fixedly connected to the power unit, and said mechanically connecting means connects said casing and the vehicle body.

* * * * *